US011227099B2

(12) United States Patent
Bhide et al.

(10) Patent No.: US 11,227,099 B2
(45) Date of Patent: Jan. 18, 2022

(54) AUTOMATIC SUMMARIZATION WITH BIAS MINIMIZATION

(71) Applicant: International Business Machines Corporation, Armonk, NY (US)

(72) Inventors: Manish Anand Bhide, Hyderabad (IN); Kuntal Dey, New Delhi (IN); Nishtha Madaan, Hisar (IN); Seema Nagar, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/421,159

(22) Filed: May 23, 2019

(65) Prior Publication Data

US 2020/0372101 A1 Nov. 26, 2020

(51) Int. Cl.
*G06F 40/151* (2020.01)
*G06F 40/205* (2020.01)
*G06F 17/18* (2006.01)
*G06F 40/284* (2020.01)

(52) U.S. Cl.
CPC ............ *G06F 40/151* (2020.01); *G06F 17/18* (2013.01); *G06F 40/205* (2020.01); *G06F 40/284* (2020.01)

(58) Field of Classification Search
None
See application file for complete search history.

(56) References Cited

U.S. PATENT DOCUMENTS

| 9,189,514 | B1 | 11/2015 | Myslinski |
| 9,633,008 | B1* | 4/2017 | Brand ............... G06F 40/30 |
| 10,388,272 | B1 | 8/2019 | Thomson |
| 2009/0083027 | A1 | 3/2009 | Hollingsworth |
| 2015/0248397 | A1 | 9/2015 | Burstein |
| 2016/0055457 | A1 | 2/2016 | Mather |

(Continued)

FOREIGN PATENT DOCUMENTS

CN 111984781 A 11/2020

OTHER PUBLICATIONS

ABC, "Interview: Robert High, Vice President and Chief Technology Officer of Watson Solutions with IBM," http://www.abc.net.au/lateline/interview-robert-high,-vice-president-and-chief/6956776, Lateline, Nov. 19, 2015, 2 pgs.

(Continued)

*Primary Examiner* — Ariel Mercado
(74) *Attorney, Agent, or Firm* — Jared L. Montanaro

(57) ABSTRACT

A processor may receive a record. The record may include one or more segments of text. The processor may automatically generate a first summary of the record. The processor may determine an overall bias of the first summary. The overall bias of the first summary may be identified from one or more instances of bias in the first summary. The processor may generate a second summary of the record. The second summary of the record may include an indicator of the overall bias of the first summary. The indicator may include a description of a type of overall bias of the first summary and a numerical value of the overall bias of the first summary. The processor may determine an overall bias of the second summary. The processor may display the second summary of the record to a user.

17 Claims, 8 Drawing Sheets

(56) References Cited

U.S. PATENT DOCUMENTS

| | | | |
|---|---|---|---|
| 2017/0124034 A1* | 5/2017 | Upadhyay | G06F 40/166 |
| 2017/0147544 A1* | 5/2017 | Modani | G06F 40/30 |
| 2017/0213130 A1 | 7/2017 | Khatri et al. | |
| 2017/0249384 A1* | 8/2017 | Kandylas | G06F 40/169 |
| 2018/0018316 A1 | 1/2018 | Bogdan et al. | |
| 2018/0032525 A1* | 2/2018 | Allen | G06F 16/345 |
| 2018/0121412 A1 | 5/2018 | Myslinski | |
| 2018/0341637 A1 | 11/2018 | Gaur et al. | |
| 2019/0236139 A1 | 8/2019 | Defelice | |
| 2019/0340297 A1* | 11/2019 | Ackermann | G06F 16/93 |
| 2020/0134091 A1* | 4/2020 | Feigenblat | G06F 16/345 |
| 2020/0279017 A1* | 9/2020 | Norton | G06F 40/30 |

OTHER PUBLICATIONS

Bhide et al., "Automatic Summarization With Bias Minimization," U.S. Appl. No. 16/421,131, filed May 23, 2019.

Bolukbasi et al., "Man is to computer programmer as woman is to homemaker? debiasing word embeddings." 30th Conference on Neural Information Processing Systems (NIPS 2016), Barcelona, Spain, 9 pgs.

Caliskan et al., "Semantics derived automatically from language corpora contain human-like biases," https://science.sciencemag.org/content/356/6334/183.full, Science Apr. 14, 2017, vol. 356, Issue 6334, pp. 183-186, 3 pgs.

Feldman et al., "Certifying and removing disparate impact," In KDD, pp. 259-268. 2015.

List of IBM Patents or Patent Applications Treated as Related, May 23, 2019, 2 pgs.

Madaan et al., "Analyze, Detect and Remove Gender Stereotyping from Bollywood Movies," http://proceedings.mlr.press/v81/madaan18a.html, Conference on Fairness, Accountability, and Transparency, Proceedings of Machine Learning Research 81:1-14, 2018, 14 pgs.

Mell et al., "The NIST Definition of Cloud Computing," Recommendations of the National Institute of Standards and Technology, U.S. Department of Commerce, Special Publication 800-145, Sep. 2011, 7 pgs.

Zhao et al., "Men also like shopping: Reducing gender bias amplification using corpus-level constraints." https://arxiv.org/abs/1707.09457, Jul. 29, 2017, abstract only, 2 pgs.

* cited by examiner

AUTOMATIC SUMMARIZATION WITH BIAS MINIMIZATION

BACKGROUND

The present disclosure relates generally to the field of record summarization, and more specifically to the automatic summarization of a record while simultaneously restricting a bias within the record.

Summarization techniques, particular those relating to textual records (e.g., academic reports, legal documents, op-eds, etc.), are increasingly popular for users to quickly scan for the main topic of a record, to ingest key information regarding a record, and/or for a user to identify any flaws in a record they are creating. Summarization techniques, however, as of now, do not take into account and correct for a perceived bias within a record, which can lead to a user being veered away from a particular record and/or can lead to a user presenting a biased record to others.

SUMMARY

Embodiments of the present disclosure include a method, computer program product, and system for automatically summarizing a record while simultaneously restricting a bias within the record. A processor may receive a record. The record may include one or more segments of text. The processor may automatically generate a first summary of the record. The processor may determine an overall bias of the first summary. The overall bias of the first summary may be identified from one or more instances of bias in the first summary. The processor may generate a second summary of the record. The second summary of the record may include an indicator of the overall bias of the first summary. The indicator may include a description of a type of overall bias of the first summary and a numerical value of the overall bias of the first summary. The processor may determine an overall bias of the second summary. The processor may display the second summary of the record to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
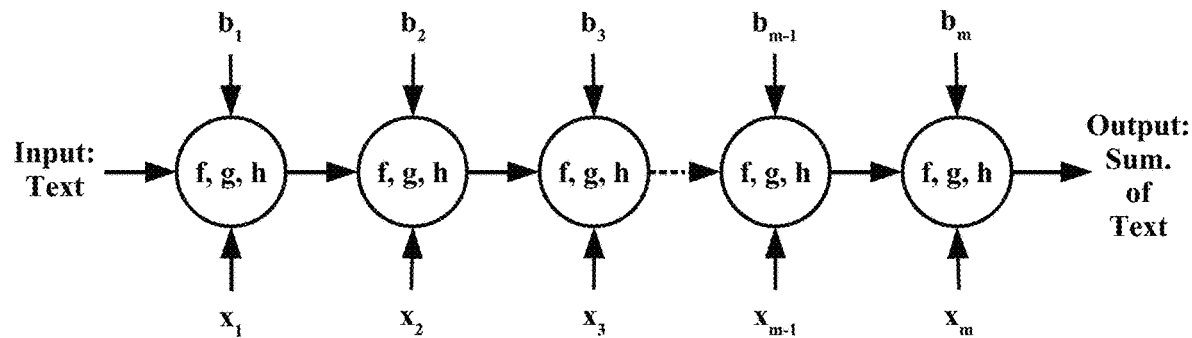
FIG. 1A illustrates an example system architecture for outputting an extractive summary of text, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to the field of record summarization, and more specifically to the automatic summarization of a record while simultaneously restricting a bias within the record. While the present disclosure is not necessarily limited to such applications, various aspects of the disclosure may be appreciated through a discussion of various examples using this context.

Recently, there has been an increase in the use of record summarization models and techniques which help users consolidate information and more readily consume information in palatable sizes. However, current record summarization models and techniques lack the ability to identify and correct for any type of bias (e.g., too partisan an opinion on a subject, too negative on a topic, too optimistic on a topic, etc.) which may be found in a record.

For instance, say a journalist writes a news article that captures a pair of opposite sides (e.g., the positive/negative, affirmative/contraindicative, etc.) about some topic. Today's summarizers would extract information regarding both sides of the topic, but without a guarantee to provide adequate coverage to the two sides. That is, they run a risk of picking up all the positive (or all the negative), all the affirmative (or all the contradictive) sides of the topic.

With such a lack of ability to adequately cover topics, users are more like to release biased information into the world and/or to consume biased information from tainted sources. In today's current framework, it would be beneficial for there to be some way to perform a record summarization that minimizes bias and provides users with fact-based, non-partisan information.

Accordingly, in some embodiments, a processor may receive a record (e.g., a book, a paper, dialogue generated by speech-to-text, etc.). The record may include one or more segments of text. The processor may tag each segment of text with an indicator. The indicator may denote a specific instance of bias in each of a respective segment of text. The processor may automatically generate a summary of the record. The summary of the record may include a set of segments of text. The set of segments of text may have/ include a different overall bias than the record. The processor may display the summary of the record to a user.

In some embodiments, tagging each segment of the text with the indicator may include the processor analyzing the one or more segments of text using natural language processing techniques. The processor may identify, from the analyzing, key text triggers within each of the one or more segments of text. The key text triggers may be one or more words identified as indicating bias.

For example, a summarizer may receive a document (e.g., record) regarding artificial intelligence understanding. The document may include the excerpt:

Tony: "We'll come back a little bit to the nature, the true nature of virtual reality later. But first, the question that philosophers are asking: will virtual reality have the capability to, one day, input physical objects into digital pathways?"

Robert: "No. Virtual reality deals with tricking a user's audiovisual senses. Virtual reality programs, however, understand the effect an object in the digital world should have on a user as if the object was in the physical world. It understands of course that a mountain has an incline and can be climbed. But it doesn't have any way of generating that incline for a user without the aid of additional mechanical help. It has no self-ability to create physical objects. It has no ability to do anything besides augment a user's audiovisual senses."

In some embodiments, the summarizer may analyze the excerpt and determine that Tony's portion of the excerpt bears no weight on the majority content of the document, which is about virtual reality. The summarizer may then turn to Robert's portion of the excerpt and determine that it is almost solely about virtual reality and begin tagging each segment of Robert's portion. In some embodiments, to tag each segment of Robert's portion the summarizer may separate Robert's portion into the segments of:

Segment (S)1: No.

S2: Virtual reality deals with tricking a user's audiovisual senses.

S3: Virtual reality programs, however, understand the effect an object in the digital world should have on a user as if the object was in the physical world.

S4: It understands of course that a mountain has an incline and can be climbed.

S5: But it doesn't have any way of generating that incline for a user without the aid of additional mechanical help.

S6: It has no self-ability to create physical objects.

S7: It has no ability to do anything besides augment a user's audiovisual senses.

It is noted that the segments are the individual sentences found in Robert's portion of the excerpt. In other embodiments, the segments may be any constituent, such as each word, each paragraph, each page, etc. of a record.

The summarizer, using natural language processing techniques (to be discussed further in regard to FIGS. 4 and 5) may tag each segment as either positive or negative (e.g., by using conditional random field modeling methods). A positive tag indicates that the segment includes information that puts virtual reality in a positive light (which may be identified by superlative words in a segment and/or an overall positive context, e.g., virtual reality can do something); a negative tag indicates that the segment includes information that puts virtual reality in a negative light (which may be identified by mediocre words in a segment and/or an overall grim context, e.g., virtual reality cannot do something).

Continuing the example above, the summarizer tags S1 as negative for using the word "No;" S2 as positive because of the positive context of virtual reality being able to understand the effects an object could have on a user; S3 as positive because of the positive context of virtual reality being able to understand a physical effect; S4 as positive because of the positive context of virtual reality being able to again understand a physical effect; S5 as negative because of the use of the words "but" and "doesn't;" S6 as negative because of the user of the word "no;" and S7 as negative because of the user of the word "no."

It is noted that in some embodiments, the summarizer can use trigger words, such as "no" and "doesn't" to determine tags for each segment, and in other embodiments, it may use the words as insight into the context of each segment and tag each segment based on context.

After tagging each segment of Robert's portion of the excerpt, the summarizer may identify that the overall bias of the excerpt (based on Robert's portion) is negative because S1, S5, S6, and S7 are all negative compared to the three positive segments S2, S3, and S4.

The summarizer may then select four segments from the possible seven (e.g., the summarizer is preprogrammed to summarize text to four lines/segments, is told by a controller/user to only output a summary of four segments, the summarizer determines that four segments is all that is needed to properly summarize Robert's portion of the excerpt/the excerpt, etc.). The processor in order to decrease the negative overall bias (and in some embodiments, to keep a neutral bias) may out put the summary of S1, S2, S3, S7, which would be a negative, positive, positive, negative summary which would read as:

"No. Virtual reality deals with tricking a user's audiovisual senses. Virtual reality programs, however, understand the effect an object in the digital world should have on a user as if the object was in the physical world. [But] It has no ability to do anything besides augment a user's audiovisual senses."

In some embodiments, the summarizer may take the partisanship of a user into account when taking each segment. For instance, the summarizer may identify from a user profile that a user is anti-virtual reality and tag S6 as positive because virtual reality not being able to create/generate physical objects may be positive for the user.

In some embodiments, identifying key text triggers may include the processor ingesting one or more corpora of training records. The training records may include referenced instances of bias. The processor may determine, from context of the training records, a degree of bias of each of the training records. The processor may associate the degree of bias of each of the training records to a respective word.

For example, a medical summarizer may be trained on the context and meaning of words, phrases, etc. by ingesting a large corpus of medical studies. The medical summarizer may determine that the terms "malignant" and "not likely" usually ended with a negative patient outcome. The medical summarizer may then identify that "malignant" had a higher likelihood of patient recovery after a treatment and the medical summarizer may assign the term "malignant" a degree of bias that is less than "not likely," which may not have a treatment plan discussed after its usage. Further training of a summarizer to determine degrees of bias/disparagement are discussed below in regard to FIG. 1A.

In some embodiments, the processor may determine that one of the one or more segments of text includes a first respective word. The processor may associate, based on the first respective word, the degree of bias to the one segment. Following the example above, now anytime the medical summarizer identifies the word "malignant" in a sentence, it may assign the sentence the degree of bias (e.g., negative connotation) that was solely assigned to the word malignant.

This may allow the medical summarizer (e.g., the processor, system, etc.) to more quickly process/ingest information and/or output summaries.

In some embodiments, generating a summary of the record may include the processor identifying that there is a set number of segments of text to be used for the summary. The processor may generate a chain for each arrangement of the one or more segments of text that can be generated based on the set number. The chain may be based on each segment of text's indicator. The processor may select a first chain that has a change to the overall bias. The change to the overall bias may be automatically determined to limit an original overall bias.

For example, as system may receive this dialogue to summarize:

"My coding language is going to be the next big thing in the computer science realm. It is so much better than any coding language out there. Archaic coding languages make you use non-intuitive commands. My coding language lets you type in a command in ordinary terms to generate a desired outcome. With my coding language there is no need to use any other coding language. Again, all other coding languages will be obsolete. Please join me for a webcast seminar on such date to learn my coding language."

The system may analyze each sentence of the dialogue and give each sentence an indicator as to some sort of bias (e.g., a bias against old computing languages, a bias towards the new computing language, information bias, etc.). The system may analyze the dialogue as such:

Sentence (S)1: "My coding language is going to be the next big thing in the computer science realm."—New computing language bias.

S2: "It is so much better than any coding language out there."—Old computing languages bias.

S3: "Archaic coding languages make you use non-intuitive commands."—Old computing languages bias.

S4: "My coding language lets you type in a command in ordinary terms to generate a desired outcome."—New computing language bias.

S5: "With my coding language there is no need to use any other coding language."—Old computing languages bias.

S6: "Again, all other coding languages will be obsolete."—Old computing language bias.

S7: "Please join me for a webcast seminar on such date to learn my coding language."—New computing language bias.

The system may determine, from the dialogue, the overall point to the dialogue is to have people join a webcast seminar in order to learn a new coding language and the system may determine that only three sentences are needed for such a point to be relayed to individuals. They system may then generate a three linked chain for each combination of the sentences:

Chain 1: S1, S2, S3;
Chain 2: S1, S3, S4 . . .
Chain 7: S5, S1, S8; . . . etc.

The system may select the chain that most represents the point of the presenter's new coding language being easier to use over ancestor coding languages and has a new computing language bias, as the original dialogue had three sentences with new computing language bias compared to four sentences with an old computing languages bias (e.g., the original dialogue had an overall old computing languages bias). The system may choose the chain of S3, S4, S7 as it has an overall new computing language bias with S4 and S7, and presents the presenter's (e.g., user's) point of asking people to attend the user's webcast. Chain S3, S4, S7 would then be generated and displayed to the user and other users as:

"Archaic coding languages make you use non-intuitive commands. My coding language lets you type in a command in ordinary terms to generate a desired outcome. Please join me for a webcast seminar on such date to learn my coding language."

It is noted that the system selects a chain that is not only bias adverse but is coherent to the goals of the user trying to convey the dialogue, e.g., that is why the system selected to keep segment S7 in the generated summary.

In some embodiments, when generating a chain for each arrangement of the one or more segments of text that can be generated based on the set number, the process generates a link for each chain one link at a time up to the set number. The processor analyzes each chain after the inclusion of a new link. The processor determines, after each new link, if one or more chains is above a bias threshold (where being above the bias threshold indicates an unwanted bias in the output). The processor excludes each of the one or more chains that is above the bias threshold from being added a new link and from being considered as a chain to be used for the summary.

Following the example above, the system may determine after only two links in the three linked chain, that any chain with two old computing languages biases (e.g., S2 and S3, S3 and S5, etc.) is above the bias threshold and should not proceed forward as a possible summary candidate. The system may determine this by identifying that the main focus of the summary is to have a new computing language bias and not an old computing languages bias. Therefore, if a three linked chain has two old computing languages biases, the new computing language bias cannot be achieved by the summarization.

In some embodiments, when selecting the first chain that has the change to the overall bias, the processor identifies, from each chain for each arrangement of the one or more segments, a respective predicted bias for each chain. The processor may exclude each chain that has the respective predicted bias above a bias threshold. The processor may exclude each chain that has the respective predicted bias below an information threshold. The processor may rank each remaining chain after excluding each chain that has the respective predicted bias above the bias threshold and excluding each chain that has the respective predicted bias below the information threshold. The first chain is the chain ranked above each of the other chains left.

Again following the example above, the system may identify from the previously designated indicators assigned to each sentence, that the chains are likely to have either an old computing languages bias or a new computing language bias. The system may exclude each chain with a likely (overall) old computing languages bias from being pursued as a summary. The system may additionally look at each chain and determine if the chain, as a summary, would be coherent based on the goal of the user.

For instance, the system may exclude the chain S1, S3, S4, which would read as:

"My coding language is going to be the next big thing in the computer science realm. Archaic coding languages make you use non-intuitive commands. My coding language lets you type in a command in ordinary terms to generate a desired outcome."

The chain is below an old computing languages bias, but the summary lacks a call to action (e.g., does not exceed/ meet an information bias), which would make the reader/ other users not understand or misunderstand what the original user wanted, e.g., for others to learn the new computing language.

After excluding the summaries that would be above the old computing language bias threshold and below the information bias, the system may rank the remaining chains (e.g., based on how coherent they are, if the main point is relayed, etc.) and summarize the first ranked chain and present it to the user or other users.

In some embodiments, a summary may be generated by other means. For instance, instead of selected fragments (e.g., segments, constituents, etc.) having their bias considered, a combination of generated fragments of a summary may be considered, where the overall bias is minimized.

In some embodiments, a processor may receive a record. The record may include one or more segments of text. The processor may automatically generate a first summary of the record. The processor may determine an overall bias of the first summary. The overall bias of the first summary may be identified from one or more instances of bias in the first summary. The processor may generate a second summary of the record. The second summary of the record may include an indicator of the overall bias of the first summary. The indicator may include a description of a type of overall bias of the first summary and a numerical value of the overall bias of the first summary. The processor may determine an overall bias of the second summary. The processor may display the second summary of the record to a user.

For example, a summarizer may receive a news article with 200 sentences and that is about home improvement. In some embodiments, the summarizer identifies that the overall bias of the news article is in favor of "do-it-yourselfers." The summarizer may then generate a first summary that is 10 sentences in length and is identified as having a bias towards obtaining a contractor for home improvement projects. The summarizer may identify that the bias towards obtaining a contractor for home improvement projects is too far off from the original article and generate a numeric value of how far off the summary is now.

For instance, the generated numeric value may be 0.7, indicating that seven of the 10 used sentences in the summary were "contractor" heavy and that that should be avoided. The summarizer may then generate a second summary, but this time, using the numeric and determining, as each sentence is shown to the summarizer, if a contractor is included or not. In such an embodiment, the summarizer does a cost/benefit analysis and it is less likely that a sentence with a contractor makes it into the second summary due to the unsatisfactory nature/bias of the first summary.

In some embodiments, the summarizer does one or more iterations of summaries (e.g., second, third, fourth, etc.) until a summary with a numeric value indicating an overall desired bias is identified. In some embodiments, the overall desired bias may be to have a nonpartisan summary, e.g., equal bias between "do-it-yourselfers" and contractors, or the overall desired bias may be to have a partisan summary. In some embodiments, the news article may act as the first summary. That is, the summarizer may determine the overall bias for the news article and use a numeric related to the overall bias of the news article to generate one or more summaries for the new article.

In some embodiments, determining the overall bias of the first summary may include the processor analyzing each constituent (e.g., summary, word, paragraph, etc.) of the first summary. The processor may identify, from each constituent, a degree of bias. The processor may tag each constituent with a respective degree of bias indicator. The processor may determine, from each degree of bias indicator, a disparate impact ratio. The disparate impact ratio may be associated with the numerical value of the overall bias of the first summary.

Following the example above, each sentence in the first summary may be analyzed by the summarizer for a contractor degree of bias. For instance, the sentence "no one likes to pay for a contractor" may be given a degree of bias of 1, as it is an absolute statement against contractors. Whereas, the sentence "we would like to update our kitchen ourselves" may be given a degree of bias of 0.5, as it implies a dislike for contractors, but is not a full condemnation.

The summarizer may take the degree of bias and determine for the first summary a disparate impact ratio, which shows the impact the overall, combined degrees of bias will have on contractors by readers/users of the first summary. The summarizer may use the disparate impact ratio when generating a second summary that is less impactful on contractors.

In some embodiments, generating the second summary of the record includes the processor generating a first constituent (or copying a first constituent of the record over as the first constituent of the summary). The processor determines, by utilizing the indicator of the overall bias of the first summary, to generate a second constituent of the second summary. A combination of the first and second constituents may not exceed the numerical value of the overall bias of the first summary. The processor may determine to not generate a third constituent of the second summary. A combination of the first, second, and third constituents may exceed the numerical value of the overall bias of the first summary.

In some embodiments, the processor may determine to generate a forth constituent of the second summary. A combination of the first, second, and fourth constituents may exceed the numerical value of the overall bias of the first summary. The processor may determine to generate a fifth constituent of the second summary. The fifth constituent may lower a combination of the first, second, fourth, and fifth constituents below the numerical value of the overall bias of the first summary.

For example, after determining a bias/disparate impact of the first summary, a system may begin generating a second summary one constituent at a time while taking into account the first summary's bias (as the second summary wants to have a bias below the first summary's). The system may look at every constituent before it is added to the second summary and determine if the added constituent will exceed the bias for the first summary. In some embodiments, the system may do this until a desired number of constituents is reached to generate the second summary. In other embodiments, the system may add constituents until the second summary achieves a threshold bias.

For instance, the system may identify that an academic report was drafted by 10 professors: two adjunct professors, three assistant professors, and five tenured professors. The system may determine that the first summary was three sentences long and each sentence was chosen from a tenured professor's statements. The system may give the first summary a bias indicator that shows a bias toward the tenured professors. The system may then generate the second summary by choosing any statement from any of the 10 professors (as there is no bias at the beginning of generation).

The system may have chosen a statement from a tenured professor as the first sentence and now the system, to maintain non-partisanship may identify that a second statement is being submitted to be added to the second summary, however, that statement is also by a tenured professor. The system may discard that statement and chose a statement by an assistant professor as the second sentence. The system may then follow the same steps provided above and select a statement from an adjunct professor as the final sentence (e.g., this way each group of professors get their academic thoughts presented in the second summary).

In some embodiments, utilizing the indicator of the overall bias of the first summary may include the processor identifying the type of overall bias of the first summary. The processor may regulate the overall bias of the second summary to an opposite of the type of overall bias of the first summary.

For example, a rival news company may take an opposition's news statement and generate a first summary of the news statement using a summarizer. The rival news company, from the first summary, may identify the opposition's stance on the topic present in the news statement and determine that they want to provide a counter opinion. The rival news company may then input to the summarizer that they want a summary that is partisan and opposite the first summary.

In some embodiments, regulating the overall bias of the second summary to the opposite of the type of overall bias of the first summary may include the processor performing an advantage-disadvantage (e.g., cost/benefit) analysis before adding each new constituent of the second summary. The advantage-disadvantage analysis may include decreasing a probability of adding a new constituent to the second summary if the new constituent is of the same type of overall bias of the first summary. The processor may also increase the probability of adding a new constituent to the second summary if the new constituent is of the opposite type of the overall bias of the first summary.

Following the example above, the first summary, as generated from the news statement, may have had the overall bias of being pro-video games and as the second summary is generated the summarizer may be on the lookout for negative video game comments. Thus, the summarizer is more likely to include statements like "video games cause eye problems" versus "video games improve hand-eye coordination" in the second summary.

In some embodiments, displaying the second summary of the record to the user may include the processor determining a numerical value of the overall bias of the second summary is below the numerical value of the overall bias of the first summary. The processor may identify that the numerical value of the overall bias of the second summary is below a predetermine bias threshold and the processor may approve the second summary for display.

For example, as an added layer of bias security, a system may require that a summary that is to be presented to a user is not only lower in bias than an original record and/or summary, but is at, or below, a bias limit. In some embodiments, this may cause the system to generate subsequent (e.g., third, fourth, etc.) summaries until one of the summaries has an overall bias below the predetermined bias threshold.

Referring now to FIG. 1A, illustrated an example system architecture 100 for outputting an extractive summary of text, in accordance with embodiments of the present disclosure. In regard to the system architecture 100, let $X=(x_1, x_2, \ldots x_m)$ be a random variable over data sequences, and $Y=(y_1, y_2, \ldots y_m)$ be a random variable over label sequences and let $B=(b_1, b_2, \ldots b_n)$ be a set of different types of biases.

Using a conditional random field as an instance of a sequence labeler (indicator), if $Z_X$ is the normalization/marginalization factor, $f_k(y_{i-1}, y_i, X)$ is a feature function over the entire observation sequence at positions i and i−1; $g_l(y_i, X)$ is a feature function at position i and the observation sequence; $h_{r,s}(y_{i-1}, y_i, X)$ is a bias function over the entire observation sequence at positions i−1 and i for all the given bias types; $\lambda_k$ and $\mu_l$ are weights learned for the feature functions $f_k$ and $g_l$ respectively, $\eta_{rs}$ is the weight learned for the bias function $h_{r,s}$ for all the bias types, and, the probability Y will be conditioned on X as:

$$P(Y|X)=(1/Z_X) \exp(\Sigma_{i,k} \lambda_k f_k(y_{i-1}, y_i, X)+\Sigma_{i,l} \mu_l g_l(y_i, X)+\Sigma_{i,r} \Sigma_{i,s} \eta_{rs} h_{r,s}(y_{i-1}, y_i, X)).$$

If the sequence of training data is defined as $\Psi=\{(X_1, Y_1), (X_2, Y_2), \ldots, (X_m, Y_m)\}$, then the learning is performed by maximizing the conditional log likelihood of the labeled sequence in the training data, defined as:

$$L_\Lambda = \Sigma_{j=1,2,\ldots,m} \log(P_\Lambda(Y_j|X_j)).$$

In some embodiments, regularizers can be added to avoid overfitting.

Further, there are two labels in the system used by the system architecture 100—(s) summary and (ns) non-summary—for each of the text fragments/constituents (such as sentences or smaller well-defined fragments); the value of the label can be s for $y_i$ but ns for $y_{i-1}$ when $y_i$ is a summary and $y_{i-1}$ is not; $x_i$ is similar to $x_{i-1}$ (above a threshold) and the difference of all types of biases between $y_i$ and $y_{i-1}$ is above a threshold. The above-mentioned is used to train the system using the system architecture 100 and they system is now trained for learning summarization.

Continuing with the summarization aspect of the system architecture 100, the most probable labeling (indicating/bias) in the sequence will be obtained as $Y'=\text{argmax } P_\Lambda(Y|X)$. The marginal probability of each state in the sequence is computed via a forward-backward procedure.

The forward alpha-values are computed as:

$$\alpha_{i+1}(y|X)=\Sigma_{y'} \alpha_i(y'|X) \exp(\Lambda_i(y', y, X)).$$

In the above, $\Lambda_i(y', y, X)$ is computed as:

$$\Lambda_i(y', y, X)=\Sigma_k \lambda_k f_k(y_{i-1}=y', y_i=y, X)+\Sigma_l \mu_l g_l(y_i=y, X)+\Sigma_r \Sigma_s \eta_{rs} h_{r,s}(y_{i-1}=y', y_i=y, X).$$

$Z_X$ is found as $\Sigma_y \alpha_i(y|X)$. Similarly, the backward beta-values $\beta_i(y|X)$ are computed.

The marginal probability of a text fragment being a part of the final summary based on its label/indicator/bias, given the whole text input, is computed as:

$$P(y_i=1|X)=(\alpha_i(1|X))/Z_X.$$

Finally, the summary is generated by ordering the sentences using $P(y_i=1|X)$ and outputting the top ranked sentences in the same sequence that they occur in the input sentence.

Figure 1B:
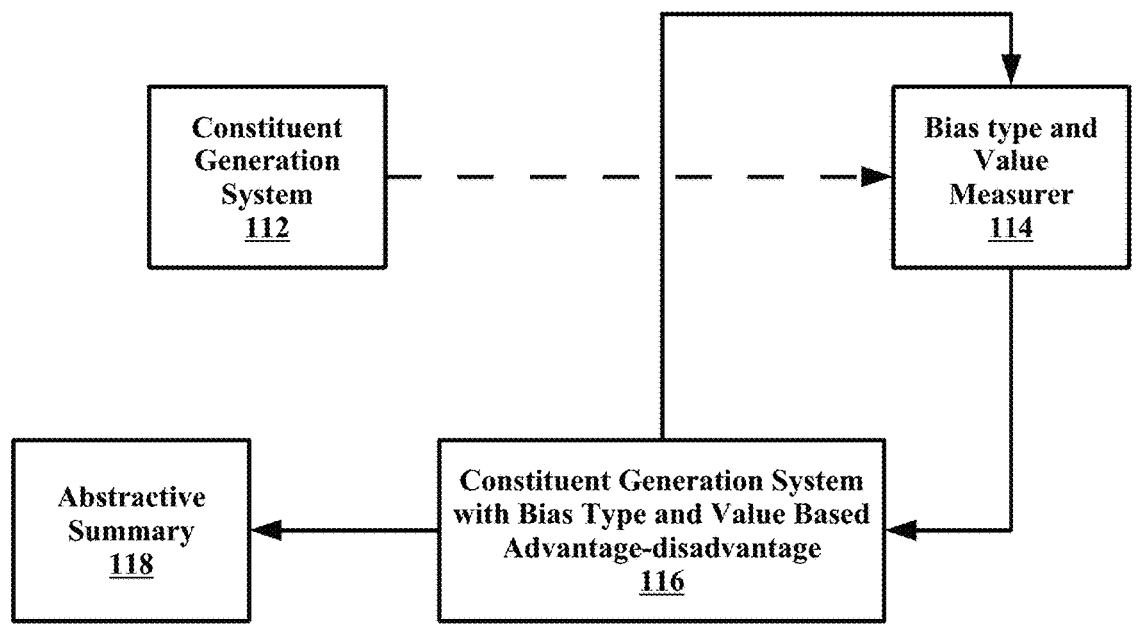
FIG. 1B illustrates an example system architecture for outputting an abstractive summary of text, in accordance with embodiments of the present disclosure.

Referring now to FIG. 1B, illustrated an example system architecture 110 for outputting an abstractive summary of text, in accordance with embodiments of the present disclosure. In regard to the system architecture 110, an abstractive summarization, iterative approach is followed.

For the system architecture 110, an initial abstractive summary and/or record (not shown) is generated and is sent to the constituent generation system 112. The constituent generation system 112 sends the constituents (e.g., sentences, etc.) of the first summary to the bias type and value measure 114 (e.g., which may have been trained similar to the system references in regard to FIG. 1A). The bias metrics of the initial summary are computed by the bias type and value measurer 114, and if the initial summary is found to be unbiased, the process utilized by the computer architecture 110 ends.

If the initial summary is determined to be biased, then the process utilized by the computer architecture 110 is re-invoked, and a signature is passed, from the bias type and value measurer 114, to this re-invocation that provides the type and value of bias (e.g., bias against dog owners, with disparate impact of 0.7).

In the re-generation process to generate an unbiased abstractive summary 118, each time a clause/sentence/constituent is considered for generation, it is passed through the constituent generation system with bias type and value based advantage-disadvantage 116, e.g., an additional reward/penalty is applied on the constituent that is in proportion to the value of the bias generated. As long as the generated constituent comprises any of the bias-creating element (such as, if it has any dog owning-related text), the generation of the less bias-introducing constituent clauses/sentences more highly probable. The computer architecture 110 utilizes the process depicted until an abstractive (e.g., second, subsequent, etc.) summary 118 can be generated, where the abstractive summary 118 has a minimum bias.

Figure 2:
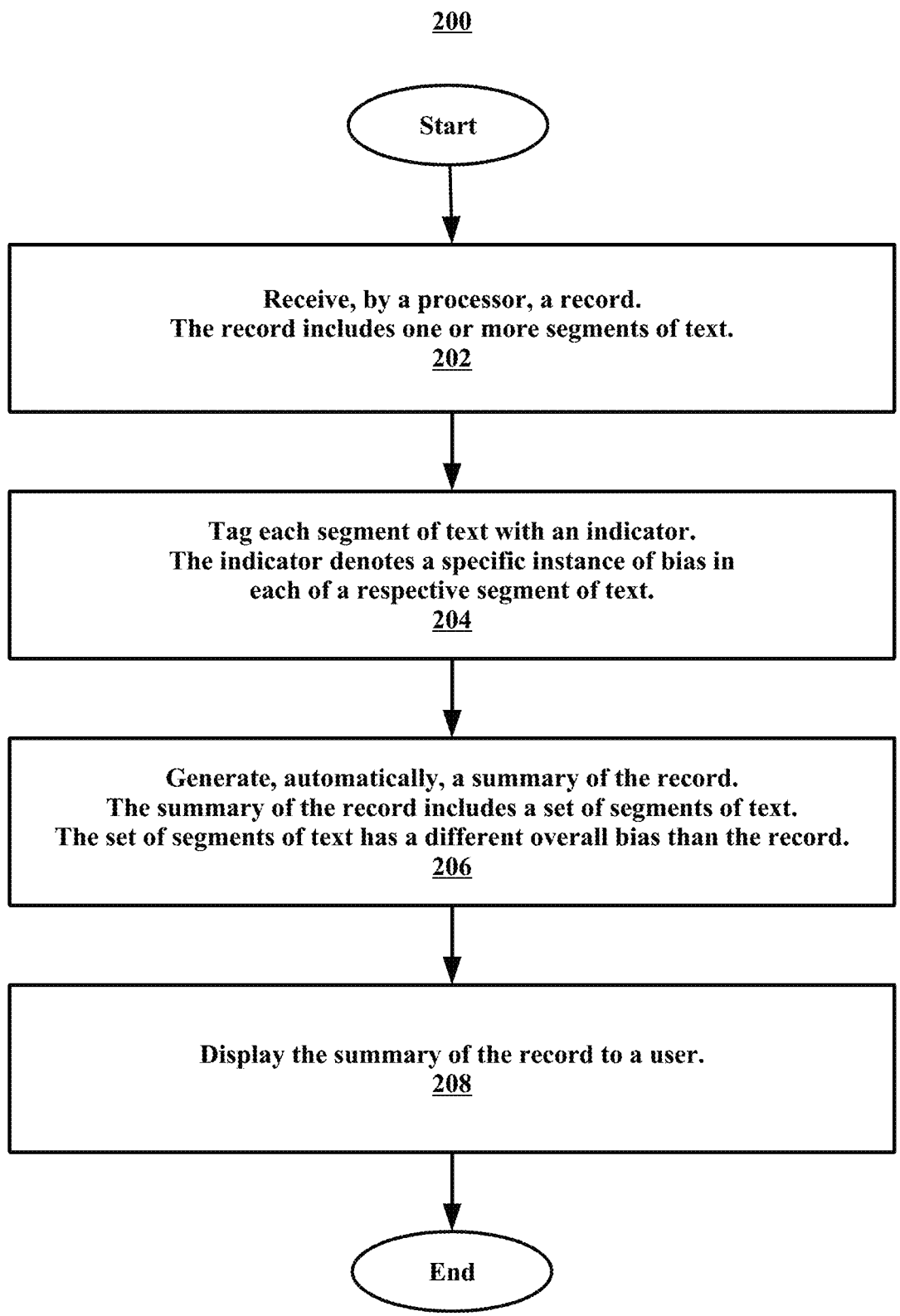
FIG. 2 illustrates a flowchart of an example method for displaying an extractive summary of a record to a user, in accordance with embodiments of the present disclosure.

Referring now to FIG. 2, illustrated a flowchart of an example method 200 for displaying an extractive summary of a record to a user, in accordance with embodiments of the present disclosure. In some embodiments, the method 200 is performed by a processor and/or a processor in a system. In some embodiments, the method 200 is performed by a system provided for in the system architecture 100 of FIG. 1A.

In some embodiments, the method 200 begins at operation 202. At operation 202, a processor receives a record. The record includes one or more segments of text. The method 200 proceeds to operation 204 where the processor tags each segment of the text with an indicator (e.g., label, etc.). The indicator denotes a specific instance of bias in each of a respective segment of text.

In some embodiments, the method 200 proceeds to operation 206. At operation 206, the processor automatically generates a summary of the record. The summary of the record includes a set of segments of text. The select number of the one or more segments of text has a different overall bias than the record.

In some embodiments, the method 200 proceeds to operation 208 where the processor displays the summary of the record to a user. In some embodiments, after operation 208, the method ends.

Figure 3:
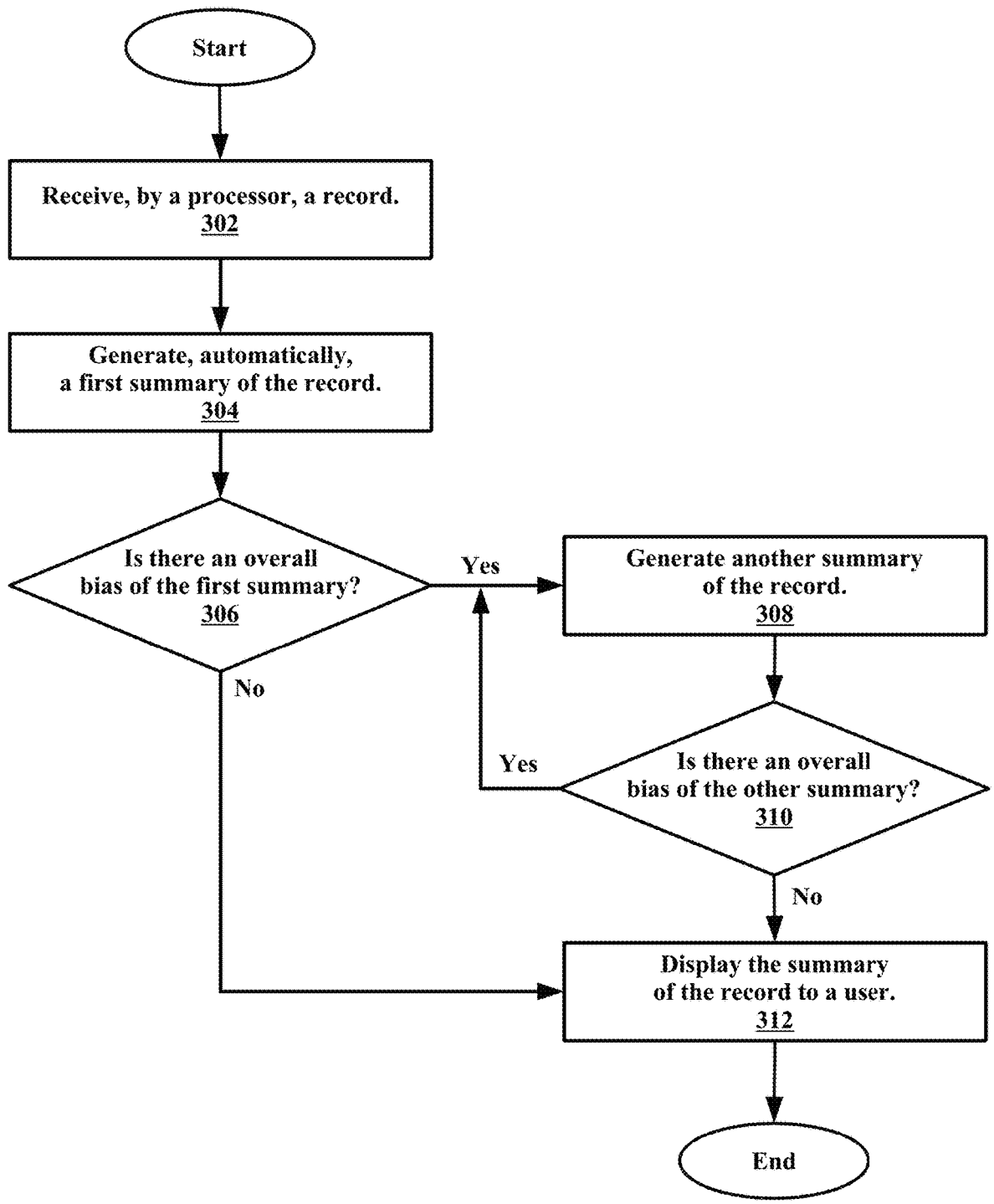
FIG. 3 illustrates a flowchart of an example method for displaying an abstractive summary of a record to a user, in accordance with embodiments of the present disclosure.

Referring now to FIG. 3, illustrated is a flowchart of an example method 300 for displaying an abstractive summary of a record to a user, in accordance with embodiments of the present disclosure. In some embodiments, the method 300 is performed by a processor and/or a processor in a system. In some embodiments, the method 300 is performed by a system provided for in the system architecture 110 of FIG. 1B.

In some embodiments, the method 300 begins at operation 302 where a processor receives a record. The record includes one or more segments of text. The method 300 proceeds to operation 304 where the processor automatically generates a first summary of the record.

In some embodiments, the method 300 proceeds to decision block 306 where it is determined if there is an overall bias of/in the first summary. The overall bias of the first summary is identified from one or more instances of bias in the first summary (e.g., from bias in the constituents of the first summary).

If there is no overall bias detected in the first summary, the method 300 proceeds to operation 312, where the first summary of the record is displayed to a user. In some embodiments, after operation 312, the method 300 ends.

In some embodiments, if there is overall bias detected in the first summary, the method 300 proceeds to operation 308. At operation 308 the processor generates another (e.g., second) summary of the record. The other summary of the record includes an indicator of the overall bias of the first summary. The indicator includes a description of a type of overall bias of the first summary and a numerical value of the overall bias of the first summary.

In some embodiments, after operation 308 the method 300 proceeds to decision block 310. At decision block 310, it is determined if there is an overall bias of the other summary. If it is determined that there is an overall bias of the other summary, the method 300 repeats operation 308 and decision block 310 until another (e.g., third, fourth, fifth, etc.) summary is generated that does not have an overall bias (e.g., above a bias threshold).

If, at decision block 310, it is determined that there is not an overall bias of the other summary, the method 300 proceeds to operation 312. At operation 312 the processor displays the summary (e.g., the first summary if no bias is determined/detected, or another summary) to a user. In some embodiments, after operation 312, the method 300 ends.

As discussed above, aspects of the disclosure may relate to natural language processing. Accordingly, an understanding of the embodiments of the present invention may be aided by describing embodiments of natural language processing systems and the environments in which these systems may operate.

Figure 4:
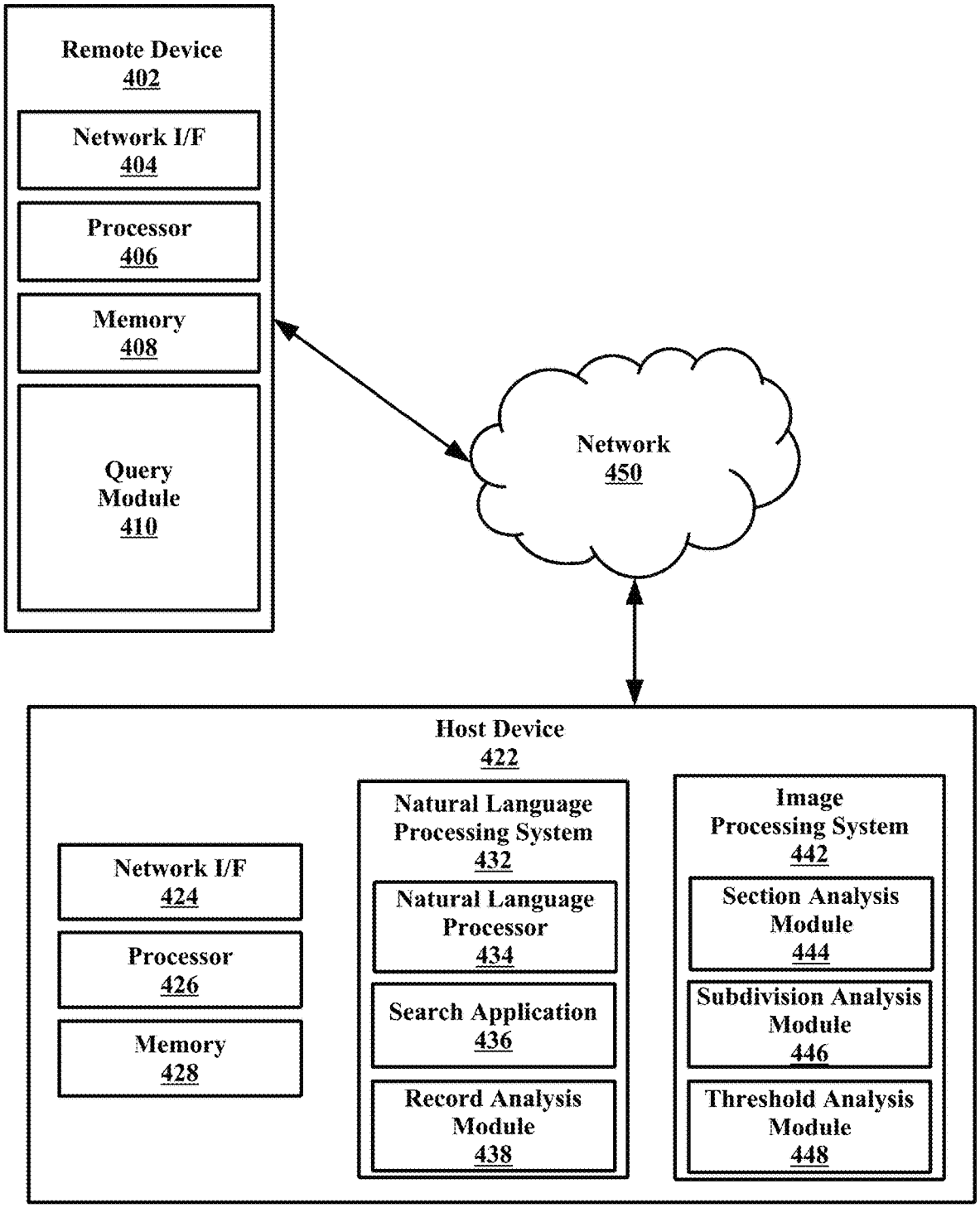
FIG. 4 illustrates a block diagram of an example computing environment in which illustrative embodiments of the present disclosure may be implemented.

Turning now to FIG. 4, illustrated is a block diagram of an example computing environment 400 in which illustrative embodiments of the present disclosure may be implemented. In some embodiments, the computing environment 400 may include a remote device 402 and a host device 422. In some embodiments, either the remote device 402 or the host device 422 may be chatbots. In some embodiments, both the remote device 402 and the host device 422 may be chatbots.

In some embodiments, the host device 422 and the remote device 402 may be computer systems. The remote devices 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be modems or network interface cards. The remote device 402 and/or the host device 422 may be equipped with a transmit or monitor. Additionally, the remote device 402 and/or the host device 422 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 402 and/or the host device 422 may be servers, desktops, laptops, or hand-held devices.

The remote device 402 and the host device 422 may be distant from each other and communicate over a network 450. In some embodiments, the host device 422 may be a central hub from which remote device 402 can establish a communication connection, such as in a client-server networking model. Alternatively, the host device 422 and remote device 402 may be configured in any other suitable networking relationship (e.g., in a peer-to-peer configuration or using any other network topology).

In some embodiments, the network 450 can be implemented using any number of any suitable communications media. For example, the network 450 may be a wide area network (WAN), a local area network (LAN), an internet, or an intranet. In certain embodiments, the remote device 402 and the host device 422 may be local to each other, and communicate via any appropriate local communication medium. For example, the remote device 402 and the host device 422 may communicate using a local area network (LAN), one or more hardwire connections, a wireless link or router, or an intranet. In some embodiments, the remote device 402 and the host device 422 may be communicatively coupled using a combination of one or more networks and/or one or more local connections. For example, the remote device 402 may be hardwired to the host device 422 (e.g., connected with an Ethernet cable) or the remote device 402 may communicate with the host device using the network 450 (e.g., over the Internet).

In some embodiments, the network 450 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 may enable a user to input (or may input automatically with or without a user) a query to the host device 422 in order to identify subdivisions of a record that include a particular subject. For example, the remote device 402 may include a query module 410 and a user interface (UI). The query module 410 may be in the form of a web browser or any other suitable software module, and the UI may be any type of interface (e.g., command line prompts, menu screens, graphical user interfaces). The UI may allow a user to interact with the remote device 402 to input, using the query module 410, a query to the host device 422, which may receive the query.

In some embodiments, the host device 422 may include a natural language processing system 432. The natural language processing system 432 may include a natural language processor 434, a search application 436, and a record module 438. The natural language processor 434 may include numerous subcomponents, such as a tokenizer, a part-of-speech (POS) tagger, a semantic relationship identifier, and a syntactic relationship identifier. An example natural language processor is discussed in more detail in reference to FIG. 5.

The search application 436 may be implemented using a conventional or other search engine, and may be distributed across multiple computer systems. The search application 436 may be configured to search one or more databases (e.g., repositories), other computer systems, and/or other chatbots for content that is related to a query submitted by the remote device 402. For example, the search application 436 may be configured to search dictionaries, papers, archived reports, and/or other related databases to help identify a particular subject related to a particular bias. The record analysis module 438 may be configured to analyze a record to identify a particular type and/or degree of bias, if the record includes such a bias and/or constituents with such a bias. The record analysis module 438 may include one or more modules or units, and may utilize the search application 436, to perform its functions (e.g., to identify a particular bias in a record), as discussed in more detail in reference to FIG. 5.

In some embodiments, the host device 422 may include an image processing system 442. The image processing system 442 may be configured to analyze images associated with a record to create an image analysis. The image processing system 442 may utilize one or more models, modules, or units to perform its functions (e.g., to analyze the images associated with the record and generate an image analysis). For example, the image processing system 442 may include one or more image processing models that are configured to identify specific images related to a record. The image processing models may include a section analysis module 444 to analyze single images associated with the record and to identify the location of one or more features of the single images. As another example, the image processing system 442 may include a subdivision module 446 to group multiple images together identified to have a common feature of the one or more features. In some embodiments, the image processing models may be implemented as software modules. For example, the image processing system 442 may include a section analysis module and a subdivision analysis module. In some embodiments, a single software module may be configured to analyze the image(s) using the image processing models.

In some embodiments, the image processing system 442 may include a threshold analysis module 448. The threshold analysis module 448 may be configured to compare, the instances of a particular subject identified in a subdivision of sections (e.g., constituents, segments, etc.) of the record against a threshold number of reference instances that may include a known/reference bias. The threshold analysis module 448 may then determine if the subdivision should be transmitted to a user. In other embodiments, the threshold analysis module 448 may be used to help determine a numerical indicator of bias for each constituent, segment, and/or summary that is generated.

In some embodiments, the host device may have an optical character recognition (OCR) module. The OCR module may be configured to receive a record, and which was sent from the remote device 402, and perform optical character recognition (or a related process) on the record to convert it into machine-encoded text so that the natural language processing system 432 may perform NLP on the report. For example, the remote device 402 may transmit a video of an academic debate to the host device 422. The OCR module may convert the video into machine-encoded text, and then the converted video may be sent to the natural language processing system 432 for analysis. In some embodiments, the OCR module may be a subcomponent of the natural language processing system 432. In other embodiments, the OCR module may be a standalone module within the host device 422. In still other embodiments, the OCR module may be located on the remote device 402 and may perform OCR on the record before the record is sent to the host device 422.

While FIG. 4 illustrates a computing environment 400 with a single host device 422 and a remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS, to generate an image analysis.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
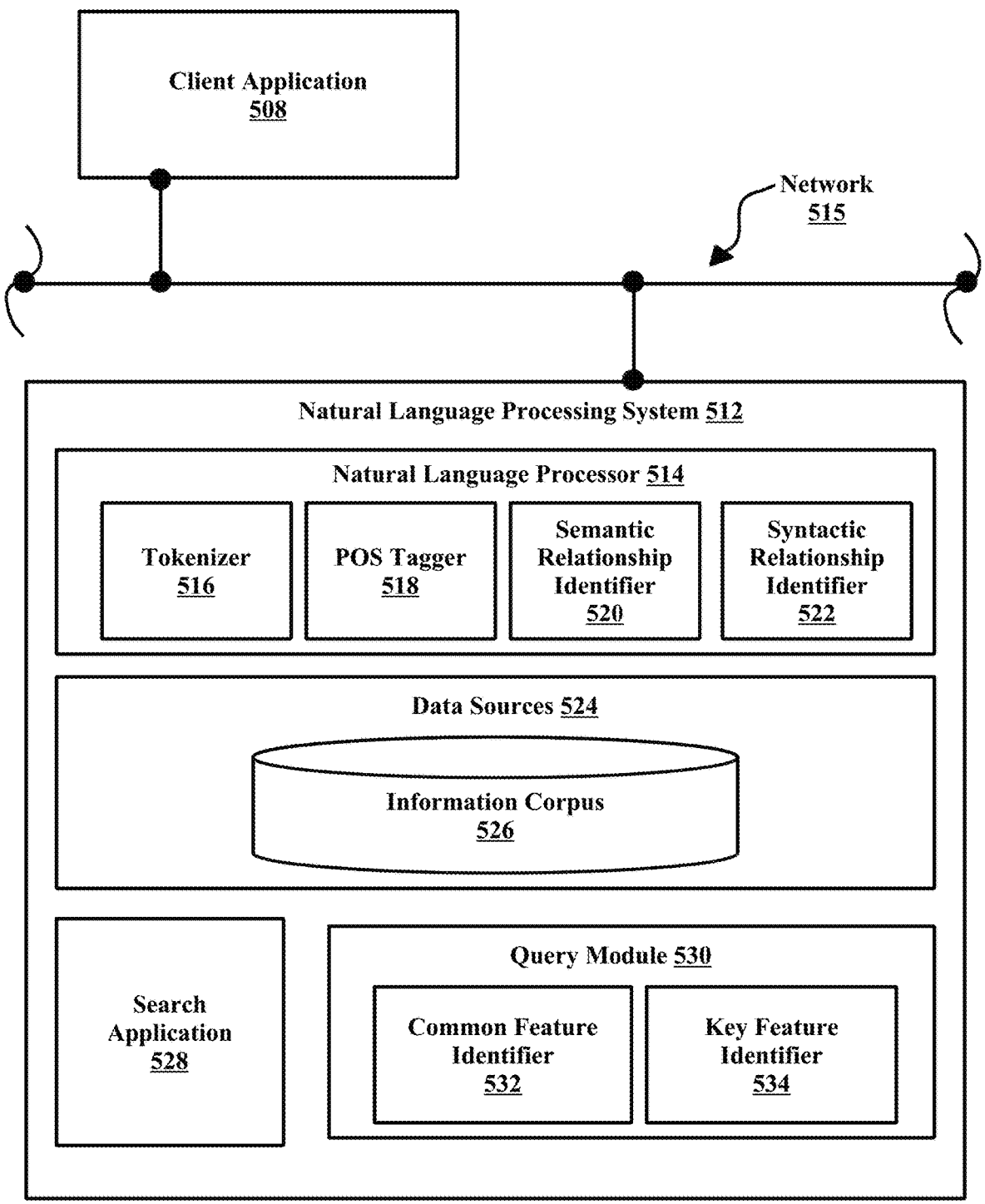
FIG. 5 illustrates a block diagram of an example natural language processing system configured to analyze a record to identify a particular subject of a query, in accordance with embodiments of the present disclosure.

Referring now to FIG. 5, shown is a block diagram of an exemplary system architecture 500, including a natural language processing system 512, configured to analyze a query, and/or key features of the query, to identify a condition and a criterion, in accordance with embodiments of the present disclosure. In some embodiments, a remote device (such as remote device 402 of FIG. 4) may submit a record and/or summary to be analyzed to the natural language processing system 512 which may be housed on a host device (such as host device 422 of FIG. 4). Such a remote device may include a client application 508, which may itself involve one or more entities operable to generate or modify information associated with the record that is then dispatched to a natural language processing system 512 via a network 515.

Consistent with various embodiments, the natural language processing system 512 may respond to record submissions sent by a client application 508. Specifically, the natural language processing system 512 may analyze a received a record and/or a query related to the record to identify a key feature/particular subject in the record (which may help determine a possible bias). In some embodiments, the natural language processing system 512 may include a natural language processor 514, data sources 524, a search application 528, and a record module 530. The natural language processor 514 may be a computer module that analyzes the record. The natural language processor 514 may perform various methods and techniques for analyzing records (e.g., syntactic analysis, semantic analysis, etc.). The natural language processor 514 may be configured to recognize and analyze any number of natural languages. In some embodiments, the natural language processor 514 may group one or more sections (e.g., constituents, sentences, words, etc.) of a record into one or more subdivisions. Further, the natural language processor 514 may include various modules to perform analyses of records. These modules may include, but are not limited to, a tokenizer 516, a part-of-speech (POS) tagger 518 (e.g., which may tag each of the one or more sections in which the particular subject is identified), a semantic relationship identifier 520, and a syntactic relationship identifier 522.

In some embodiments, the tokenizer 516 may be a computer module that performs lexical analysis. The tokenizer 516 may convert a sequence of characters (e.g., images, sounds, etc.) into a sequence of tokens. A token may be a string of characters included in a record and categorized as a meaningful symbol. Further, in some embodiments, the tokenizer 516 may identify word boundaries in a record and break any text within the record (e.g., from closed-caption, etc.) into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a record to correspond to a particular part of speech. The POS tagger 518 may read a passage or other text in natural language and assign a part of speech to each word or other token. The POS tagger 518 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed queries, documents, texts, records, etc. (e.g., the content of one record may shed light on the meaning of one or more subjects in another record). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a record with part of speech categories. In some embodiments, the POS tagger 518 may tag tokens or words of a query and/or record to be parsed by the natural language processing system 512.

In some embodiments, the semantic relationship identifier 520 may be a computer module that may be configured to identify semantic relationships of recognized subjects (e.g., words, phrases, images, etc.) in a record. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a record composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may group sections of a record into subdivisions and generates corresponding data structures for one or more subdivisions of the query and/or record. For example, in response to receiving a record at the natural language processing system 512, the natural language processor 514 may output subdivisions of the record as data structures. In some embodiments, a subdivision may be represented in the form of a graph structure. To generate the subdivision, the natural language processor 514 may trigger computer modules 516-522.

In some embodiments, the output of natural language processor 514 may be used by search application 528 to perform a search of a set of (e.g., one or more) corpora to retrieve one or more subdivision including a particular subject associated with a query and send the output to an image processing system and to a comparator. As used herein, a corpus may refer to one or more data sources, such as the data sources 524 of FIG. 5. In some embodiments, the data sources 524 may include video libraries, data warehouses, information corpora, data models, and document repositories. In some embodiments, the data sources 524 may include an information corpus 526. The information corpus 526 may enable data storage and retrieval. In some embodiments, the information corpus 526 may be a subject repository that houses a standardized, consistent, clean, and integrated list of images and dialogue. The data may be sourced from various operational systems. Data stored in the information corpus 526 may be structured in a way to specifically address reporting and analytic requirements. In some embodiments, the information corpus 526 may be a relational database.

In some embodiments, the record module 530 may be a computer module that identifies common (e.g., information) features and key features (e.g., that show bias) within constituents of a record and/or the record itself. In some embodiments, the record module 530 may include a common feature identifier 532 and a key feature identifier 534. When a record is received by the natural language processing system 512, the record module 530 may be configured to analyze the record using natural language processing to identify a key feature/particular subject. The record module 530 may first identify one or more features/subjects in the record using the natural language processor 514 and related subcomponents 516-522. After identifying the one or more subjects, the common feature identifier 532 may identify one or more common features present in sections of the record. In some embodiments, the common features in the sections may be the same subject that is identified. Once a common feature is identified, the common feature identifier 532 may be configured to transmit the sections that include the common feature to an image processing system (shown in FIG. 4) and/or to a comparator (e.g., the threshold analysis module 448 of FIG. 4).

After identifying common features of a record using the common feature identifier 532, the record module 530 may group sections of the record having common features into subdivisions. The key feature identifier 534 may then identify a key feature/particular subject in subdivisions of the record. In some embodiments, the particular subject may have one or more of the common features identified in the one or more sections of the record. After identifying a particular subject relating to the query, the key feature identifier 534 may be configured to transmit the criterion to an image processing system (shown in FIG. 4) and/or to a comparator.

That is, common features of a record identified by the common feature identifier 532 may be grouped together and designated as informational/nonce features that have no bearing on bias and key features identified by the key feature identifier may be grouped together and designated and features that have bearing on bias.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
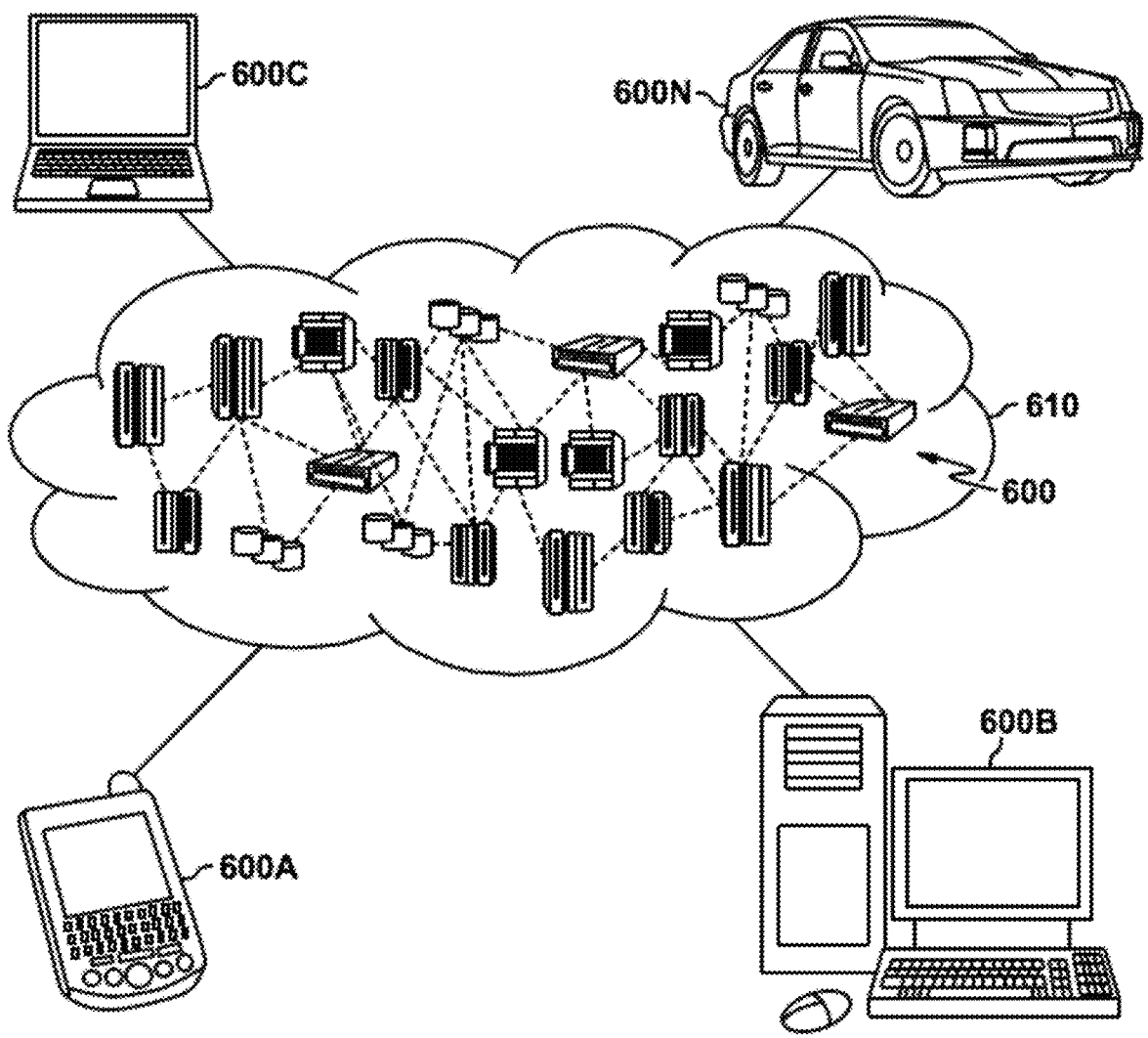
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
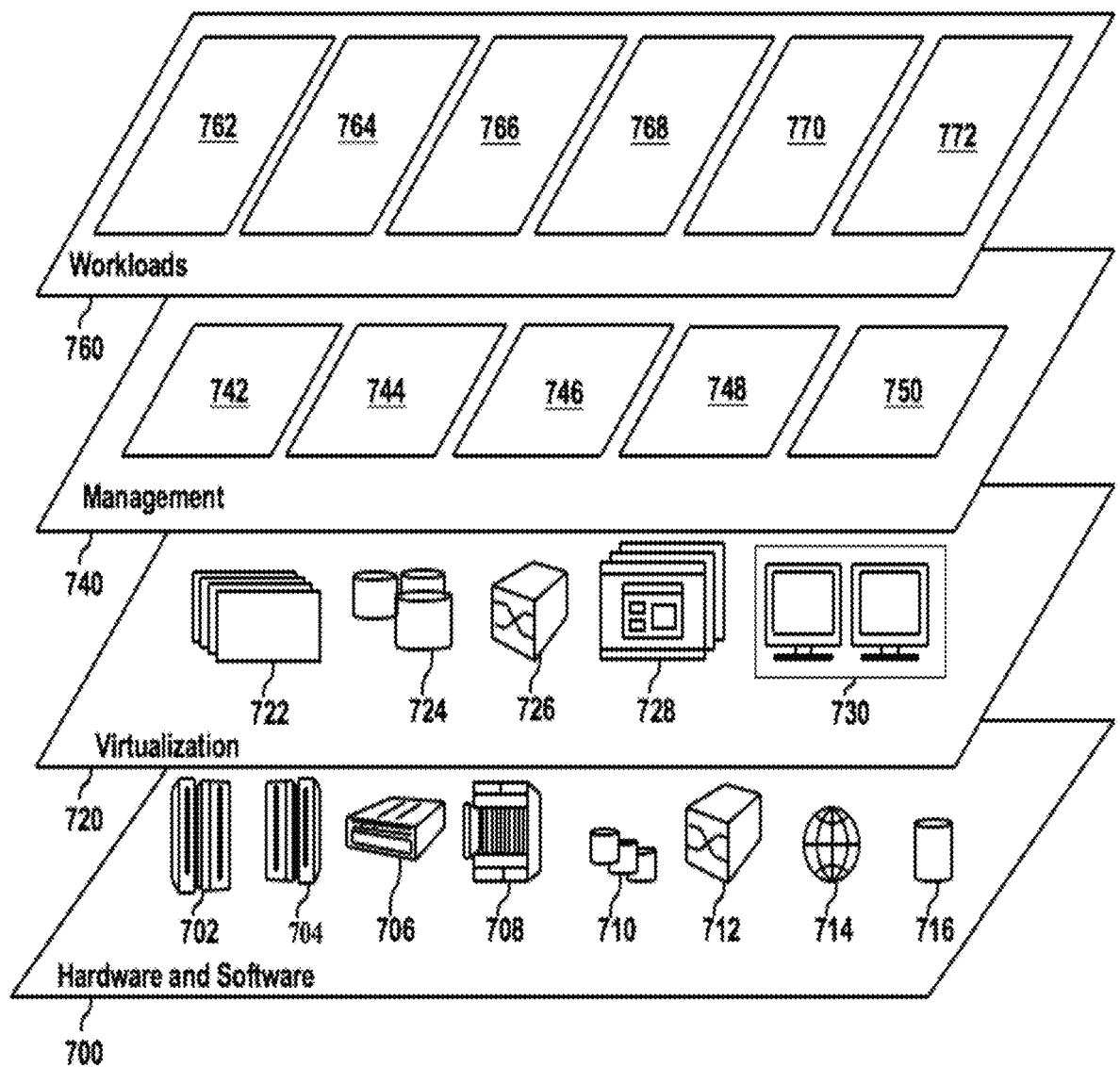
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the invention are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and media summarizing 772.

Figure 8:
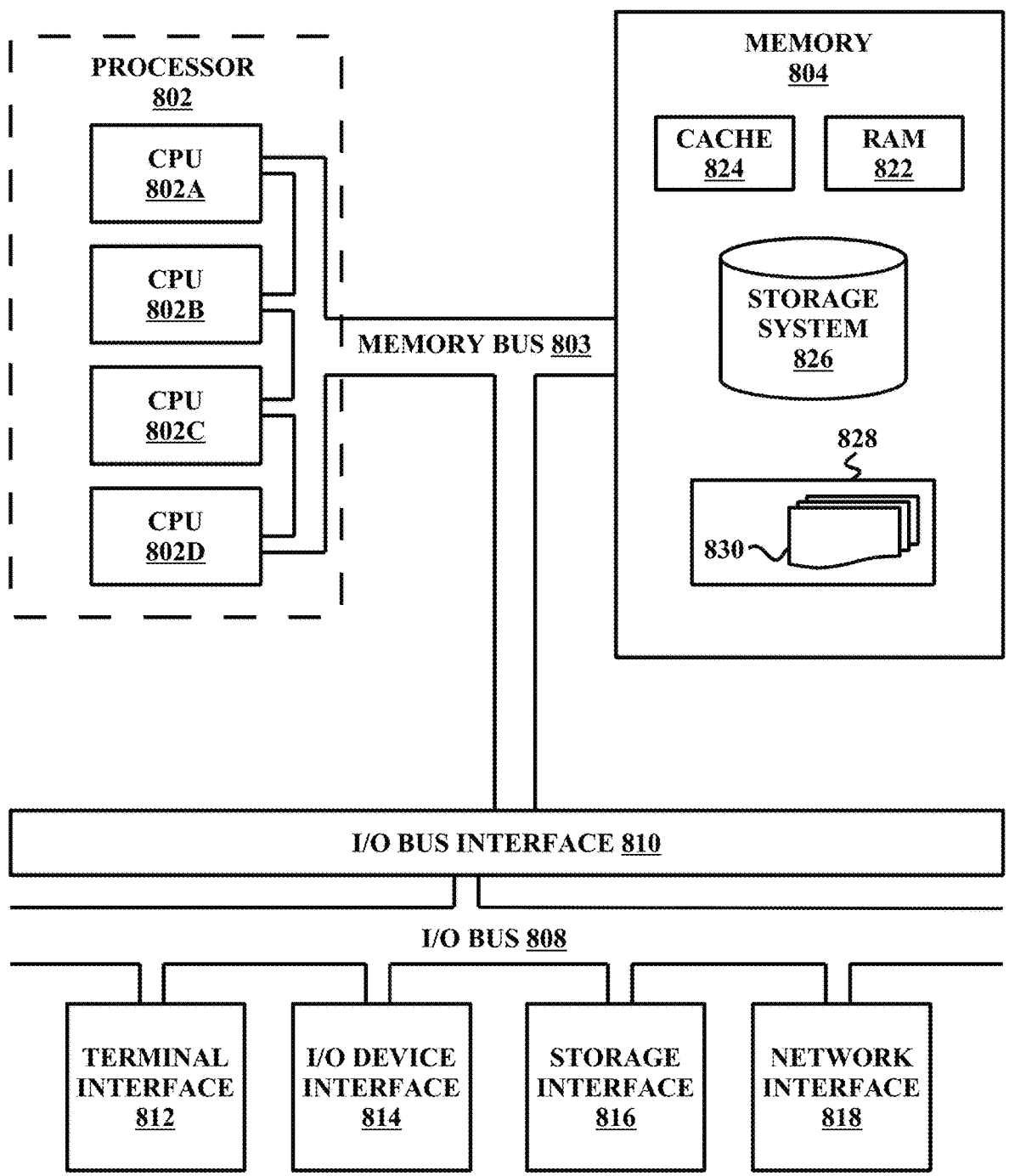
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, by a processor, a record, wherein the record includes one or more segments of text;
   generating, automatically, a first summary of the record;
   determining an overall bias of the first summary, wherein the overall bias of the first summary is identified from one or more instances of bias in the first summary, and wherein determining the overall bias of the first summary comprises:
   analyzing each constituent of the first summary,
   identifying, for each constituent, a degree of bias,
   tagging each constituent with a respective degree of bias indicator, and
   determining, from each degree of bias indicator, a disparate impact ratio, wherein
   the disparate impact ratio is associated with the numerical value of the overall bias of the first summary;
   generating a second summary of the record, wherein the second summary of the record includes an indicator of the overall bias of the first summary, and wherein the indicator includes a description of a type of overall bias of the first summary and a numerical value of the overall bias of the first summary;
   determining an overall bias of the second summary; and
   displaying the second summary of the record to a user.

2. The method of claim 1, wherein generating the second summary of the record comprises:
   generating a first constituent of the second summary;
   determining, by utilizing the indicator of the overall bias of the first summary, to generate a second constituent of the second summary, wherein a combination of the first and second constituents do not exceed the numerical value of the overall bias of the first summary; and
   determining to not generate a third constituent of the second summary, wherein a combination of the first, second, and third constituents exceed the numerical value of the overall bias of the first summary.

3. The method of claim 2, wherein generating the second summary of the record further comprises:
   determining to generate a fourth constituent of the second summary, wherein a combination of the first, second, and fourth constituents exceed the numerical value of the overall bias of the first summary; and
   determining to generate a fifth constituent of the second summary, wherein the fifth constituent lowers a combination of the first, second, fourth, and fifth constituents below the numerical value of the overall bias of the first summary.

4. The method of claim 2, wherein utilizing the indicator of the overall bias of the first summary comprises:
   identifying the type of overall bias of the first summary; and
   regulating the overall bias of the second summary to an opposite of the type of overall bias of the first summary.

5. The method of claim 4, wherein regulating the overall bias of the second summary to the opposite of the type of overall bias of the first summary comprises:
   performing an advantage-disadvantage analysis before adding each new constituent of the second summary, wherein the advantage-disadvantage analysis includes decreasing a probability of adding a new constituent to the second summary if the new constituent is of the same type of overall bias of the first summary and increasing the probability of adding a new constituent to the second summary if the new constituent is of the opposite type of the overall bias of the first summary.

6. The method of claim 1, wherein displaying the second summary of the record to the user comprises:
   determining that a numerical value of the overall bias of the second summary is below the numerical value of the overall bias of the first summary;

identifying that the numerical value of the overall bias of the second summary is below a predetermined bias threshold; and approving the second summary for display.

7. A system comprising:
a memory; and
a processor in communication with the memory, the processor being configured to perform operations comprising:
receiving a record, wherein the record includes one or more segments of text;
generating, automatically, a first summary of the record;
determining an overall bias of the first summary, wherein the overall bias of the first summary is identified from one or more instances of bias in the first summary, and wherein determining the overall bias of the first summary comprises:
analyzing each constituent of the first summary,
identifying, for each constituent, a degree of bias,
tagging each constituent with a respective degree of bias indicator, and
determining, from each degree of bias indicator, a disparate impact ratio, wherein
the disparate impact ratio is associated with the numerical value of the overall bias of the first summary;
generating a second summary of the record, wherein the second summary of the record includes an indicator of the overall bias of the first summary, and wherein the indicator includes a description of a type of overall bias of the first summary and a numerical value of the overall bias of the first summary;
determining an overall bias of the second summary; and
displaying the second summary of the record to a user.

8. The system of claim 7, wherein generating the second summary of the record comprises:
generating a first constituent of the second summary;
determining, by utilizing the indicator of the overall bias of the first summary, to generate a second constituent of the second summary, wherein a combination of the first and second constituents do not exceed the numerical value of the overall bias of the first summary; and
determining to not generate a third constituent of the second summary, wherein a combination of the first, second, and third constituents exceed the numerical value of the overall bias of the first summary.

9. The system of claim 8, wherein generating the second summary of the record further comprises:
determining to generate a fourth constituent of the second summary, wherein a combination of the first, second, and fourth constituents exceed the numerical value of the overall bias of the first summary; and
determining to generate a fifth constituent of the second summary, wherein the fifth constituent lowers a combination of the first, second, fourth, and fifth constituents below the numerical value of the overall bias of the first summary.

10. The system of claim 8, wherein utilizing the indicator of the overall bias of the first summary comprises:
identifying the type of overall bias of the first summary; and
regulating the overall bias of the second summary to an opposite of the type of overall bias of the first summary.

11. The system of claim 10, wherein regulating the overall bias of the second summary to the opposite of the type of overall bias of the first summary comprises:
performing an advantage-disadvantage analysis before adding each new constituent of the second summary, wherein the advantage-disadvantage analysis includes decreasing a probability of adding a new constituent to the second summary if the new constituent is of the same type of overall bias of the first summary and increasing the probability of adding a new constituent to the second summary if the new constituent is of the opposite type of the overall bias of the first summary.

12. The system of claim 7, wherein displaying the second summary of the record to the user comprises:
determining that a numerical value of the overall bias of the second summary is below the numerical value of the overall bias of the first summary;
identifying that the numerical value of the overall bias of the second summary is below a predetermined bias threshold; and
approving the second summary for display.

13. A non-transitory computer program product comprising a computer readable storage medium having program instructions embodied therewith, the program instructions executable by a processor to cause the processor to perform a method, the method comprising:
receiving, by a processor, a record, wherein the record includes one or more segments of text;
generating, automatically, a first summary of the record;
determining an overall bias of the first summary, wherein the overall bias of the first summary is identified from one or more instances of bias in the first summary, and wherein determining the overall bias of the first summary comprises:
analyzing each constituent of the first summary,
identifying, for each constituent, a degree of bias,
tagging each constituent with a respective degree of bias indicator, and
determining, from each degree of bias indicator, a disparate impact ratio, wherein
the disparate impact ratio is associated with the numerical value of the overall bias of the first summary;
generating a second summary of the record, wherein the second summary of the record includes an indicator of the overall bias of the first summary, and wherein the indicator includes a description of a type of overall bias of the first summary and a numerical value of the overall bias of the first summary;
determining an overall bias of the second summary; and
displaying the second summary of the record to a user.

14. The non-transitory computer program product of claim 13, wherein generating the second summary of the record comprises:
generating a first constituent of the second summary;
determining, by utilizing the indicator of the overall bias of the first summary, to generate a second constituent of the second summary, wherein a combination of the first and second constituents do not exceed the numerical value of the overall bias of the first summary; and
determining to not generate a third constituent of the second summary, wherein a combination of the first, second, and third constituents exceed the numerical value of the overall bias of the first summary.

15. The non-transitory computer program product of claim 14, wherein generating the second summary of the record further comprises:
determining to generate a fourth constituent of the second summary, wherein a combination of the first, second, and fourth constituents exceed the numerical value of the overall bias of the first summary; and
determining to generate a fifth constituent of the second summary, wherein the fifth constituent lowers a combination of the first, second, fourth, and fifth constituents below the numerical value of the overall bias of the first summary.

16. The non-transitory computer program product of claim 14, wherein utilizing the indicator of the overall bias of the first summary comprises:
   identifying the type of overall bias of the first summary; and
   regulating the overall bias of the second summary to an opposite of the type of overall bias of the first summary.

17. The non-transitory computer program product of claim 16, wherein regulating the overall bias of the second summary to the opposite of the type of overall bias of the first summary comprises:
   performing an advantage-disadvantage analysis before adding each new constituent of the second summary, wherein the advantage-disadvantage analysis includes decreasing a probability of adding a new constituent to the second summary if the new constituent is of the same type of overall bias of the first summary and increasing the probability of adding a new constituent to the second summary if the new constituent is of the opposite type of the overall bias of the first summary.

* * * * *